United States Patent
Wang

(10) Patent No.: US 11,554,728 B2
(45) Date of Patent: Jan. 17, 2023

(54) ACOUSTIC ENERGY DAMPER MEMBER FOR A PANEL

(71) Applicant: GM GLOBAL TECHNOLOGY OPERATIONS LLC, Detroit, MI (US)

(72) Inventor: Chong Wang, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 555 days.

(21) Appl. No.: 16/744,477

(22) Filed: Jan. 16, 2020

(65) Prior Publication Data
US 2021/0221306 A1 Jul. 22, 2021

(51) Int. Cl.
*B60R 13/08* (2006.01)
*G10K 11/162* (2006.01)

(52) U.S. Cl.
CPC ........... *B60R 13/08* (2013.01); *G10K 11/162* (2013.01)

(58) Field of Classification Search
CPC .............................. G10K 11/162; B60R 13/08
USPC ......................................................... 181/294
See application file for complete search history.

(56) References Cited

U.S. PATENT DOCUMENTS

| 10,767,365 | B1* | 9/2020 | Noxon, IV | E04B 1/994 |
| 2007/0201718 | A1* | 8/2007 | Shimoe | H04R 7/18 |
| | | | | 381/396 |
| 2021/0142773 | A1* | 5/2021 | Su | G10K 11/172 |

* cited by examiner

*Primary Examiner* — Forrest M Phillips

(57) ABSTRACT

An assembly includes a panel member and an acoustic sink member. The panel member has a panel edge, and first and second long axes defining a plane. The panel member has a first material composition. The acoustic sink member has a body with a periphery which is coupled to the panel edge. The body has a second material composition, which is distinct from the first material composition. An acoustic impedance of the sink member at the periphery is equal to an acoustic impedance of the panel member at the panel edge, and the body has a cross-sectional profile defined by a power law.

18 Claims, 2 Drawing Sheets

Section A-A

ACOUSTIC ENERGY DAMPER MEMBER FOR A PANEL

INTRODUCTION

The present disclosure relates generally to acoustic management, and more particularly to acoustic management for motor vehicles.

Motor vehicles are subject to noise, vibration, and harshness (NVH) based on a variety of factors. Such factors include, but are not limited to, moving components of the vehicle such as drivetrain components, and external factors such as road noise or wind. If not mitigated, such noises and vibrations may be transmitted to occupants of the vehicle.

SUMMARY

An assembly according to the present disclosure includes a panel member and an acoustic sink member. The panel member has a panel edge, and first and second long axes defining a plane. The panel member has a first material composition. The acoustic sink member has a body with a periphery which is coupled to the panel edge. The body has a second material composition, which is distinct from the first material composition. An acoustic impedance of the sink member at the periphery is equal to an acoustic impedance of the panel member at the panel edge, and the body has a cross-sectional profile defined by a power law.

In an exemplary embodiment, the first material composition comprises a metal, which may be steel.

In an exemplary embodiment, the second material composition comprises a plastic, which may be ABS.

In an exemplary embodiment, the panel member is a component of a motor vehicle.

In an exemplary embodiment, the panel member has an aperture extending therethrough, and the panel edge defines the aperture. In such embodiments, the sink member is disposed in the aperture.

A method of configuring a damper according to the present disclosure includes providing a panel member having a panel edge. The panel member has a first material composition. The method also includes determining a second material composition for an acoustic sink member, determining a peripheral thickness of the acoustic sink member to match acoustic impedance of the panel member, determining a length dimension of the acoustic sink member based on a desired frequency for damping, and determining a thickness profile of the acoustic sink member based on a power law. The method further includes assembling the acoustic sink member to the panel edge.

Embodiments according to the present disclosure provide a number of advantages. For example, the present disclosure provides a damping assembly providing desirable acoustic damping properties while having a lower damper mass and volume than known solutions, thereby providing benefits to packaging and range and/or efficiency.

The above and other advantages and features of the present disclosure will be apparent from the following detailed description of the preferred embodiments when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As discussed above, motor vehicles are subject to NVH based on a variety of factors. Such NVH may be caused by transmission of vibrations through body panels or structural panels of the motor vehicle. Known solutions for controlling the transmission of vibrations through panels generally involve applying a damping or deadening layer onto panels, e.g. as a patch of damping material. Such damping or deadening layers may effectively control vibrations by dissipating vibrational energy. However, such damping or deadening layers may incur additional material cost and manufacturing expenses, while also contributing weight and bulk. As an example, a known patch of damping material for a motor vehicle may be approximately three millimeters in thickness and approximately one square meter in area, weighing approximately four kilograms. Such additional weight and bulk may impose packaging challenges while also decreasing fuel economy and/or range of the motor vehicle.

Figure 1:
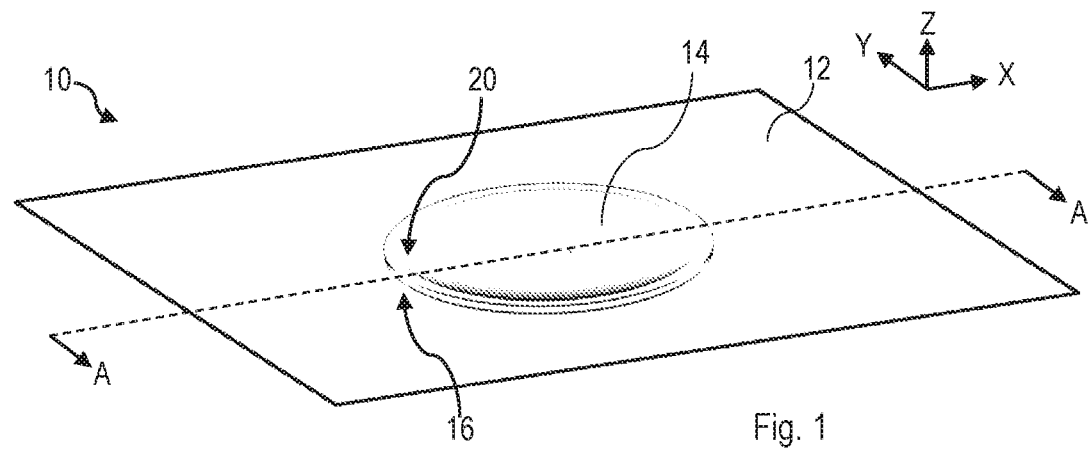
FIG. 1 is an illustration of an acoustic damper assembly according to a first embodiment of the present disclosure.

Referring now to FIG. 1, an acoustic damper assembly 10 according to a first embodiment of the present disclosure is illustrated. The acoustic damper assembly 10 includes a panel member 12 and an acoustic damper member 14.

The panel member 12 is a generally planar body, e.g. extending primarily in an X-Y plane and having a thickness in a Z-direction. According to various embodiments, the panel member 12 may define a body panel or a structural panel of a motor vehicle. However, in other embodiments the panel member 12 may define any generally planar panel for which acoustic damping is desired. In an exemplary embodiment the panel member 12 comprises a metallic material, e.g. steel. However, in other embodiments the panel member may comprise other materials as appropriate.

The panel member 12 has an edge portion 16 defining a periphery of the panel member 12. In the embodiment illustrated in FIG. 1, the panel member 12 has an aperture extending therethrough, and the edge portion 16 defines a periphery of the aperture. However, in other embodiments, as will be discussed in further detail below with respect to FIG. 4, the edge portion 16 may define an outer periphery of the panel 12.

The acoustic damper member 14, which may alternatively be referred to as an acoustic sink, has a body 18 with a periphery 20. The periphery 20 of the damper member 14 is secured to the edge portion 16 of the panel member 12, e.g. via adhesive, press-fitting, or any other suitable coupling method. The body 18 of the damper member 14 has a material composition which is distinct from that of the panel member 12. In an exemplary embodiment the body 18 may comprise a plastic material, e.g. acrylonitrile butadiene styrene (ABS). However, in other embodiments the body 18 may comprise other materials as appropriate.

The body 18 of the damper member 14 has dimensions, e.g. a length in X and/or Y directions and a thickness in a Z direction, which are configured to provide suitable damping characteristics, as will presently be described in further detail. In the embodiment illustrated in FIGS. 1 and 2 the body 18 is generally circular in the X-Y plane; however, in other embodiments the damper member 14 may have other shapes.

The thickness $T_1$ of the body 18 at the periphery 20 is selected to match an acoustic impedance of the edge portion 16 of the panel member 12, according to the equation:

$$\left(\frac{T_1}{T_2}\right)^5 = \frac{5}{2}\sqrt{\frac{\rho_2}{\rho_1} \cdot \left(\frac{E_2}{E_1}\right)^3}$$

Figure 2:
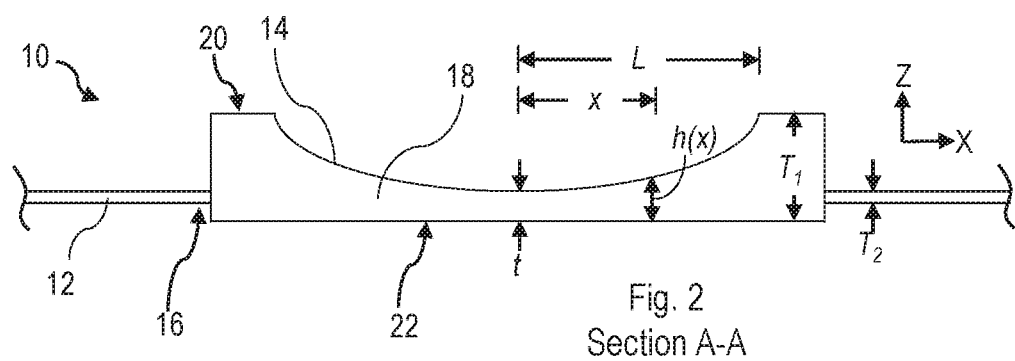
FIG. 2 is a cross-section along A-A in FIG. 1.

In the above equation, $T_1$ is the thickness of the body 18 at the periphery 20 and $T_2$ is the thickness of the edge portion 16 of the panel member 12, as shown in FIG. 2. $E_1$ and $\rho_1$ are the Young's module and material density, respectively, of the body 18, and $E_2$ and $\rho_2$ are the Young's module and material density, respectively, of the panel 12.

By matching the acoustic impedance of the periphery 20 of the body 18 to that of the edge portion 16 of the panel member 12, acoustic energy, e.g. in the form of vibrations, may freely flow from the panel member 12 to the body 18.

A length dimension L of the damper member, e.g. a radius in the embodiment illustrated in FIGS. 1 and 2, is configured to control the effective frequency. A larger length L may be employed to damp relatively lower frequency, and a shorter length L may be employed to damp relatively higher frequencies. A suitable length L may be determined, e.g. via analysis such as a finite element method (FEM) simulation, according to the frequencies desired to be damped for a given application.

The thickness profile of the damper member at a given longitudinal or radial position x is thereafter determined according to a power law, according to the equation:

$$h(x) = (T_1 - t)\left(\frac{x}{L}\right)^m + t,$$
$$2 < m < 4$$

In the above equation, h(x) is the local thickness of the body at position x, t is a minimum thickness of the body 18, and m is a power law index. The power law index m impacts the frequency range to be damped. A suitable power law index m may be determined, e.g. via analysis such as an FEM simulation, according to the frequencies desired to be damped for a given application.

By providing a thickness profile according to a power law, acoustic energy, e.g. in the form of vibrations, may be trapped within the body 18 of the damper member 14 and inhibited from flowing back to the panel 12. The damper member 14 may thereby function as an acoustic energy sink.

In the embodiment illustrated in FIG. 2, one face 22 of the body 18 is generally planar. Such embodiments may provide more desirable visible characteristics or packaging in some configurations.

Figure 3:
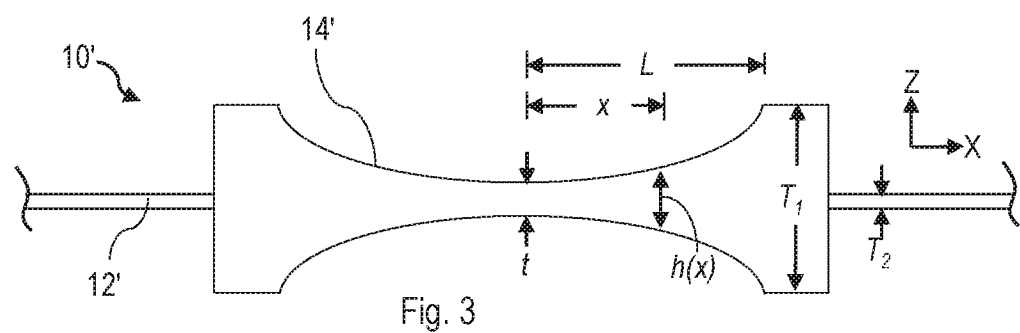
FIG. 3 is an illustration of an acoustic damper assembly according to a second embodiment of the present disclosure.

Referring to FIG. 3, a second embodiment of an assembly 10' is illustrated. In the embodiment of FIG. 3, upper and lower faces of the damper member 14' are contoured to provide the dimensional characteristics described in the equations above and thereby provide damping to the panel member 12'.

Figure 4:
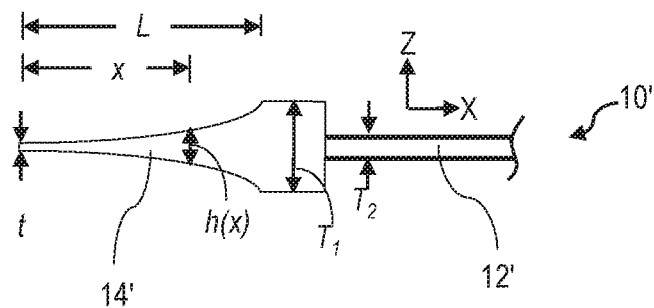
FIG. 4 is an illustration of an acoustic damper assembly according to a third embodiment of the present disclosure.

Referring to FIG. 4, a third embodiment of an assembly 10" is illustrated. In the embodiment of FIG. 4, the damper member 14" is provided at an outer edge of the panel member 12", rather than within in aperture as described with respect to FIGS. 2 and 3. The dimensional characteristics of the damper member 14" are selected as described in the equations above and thereby provide damping to the panel member 12".

Figure 5:
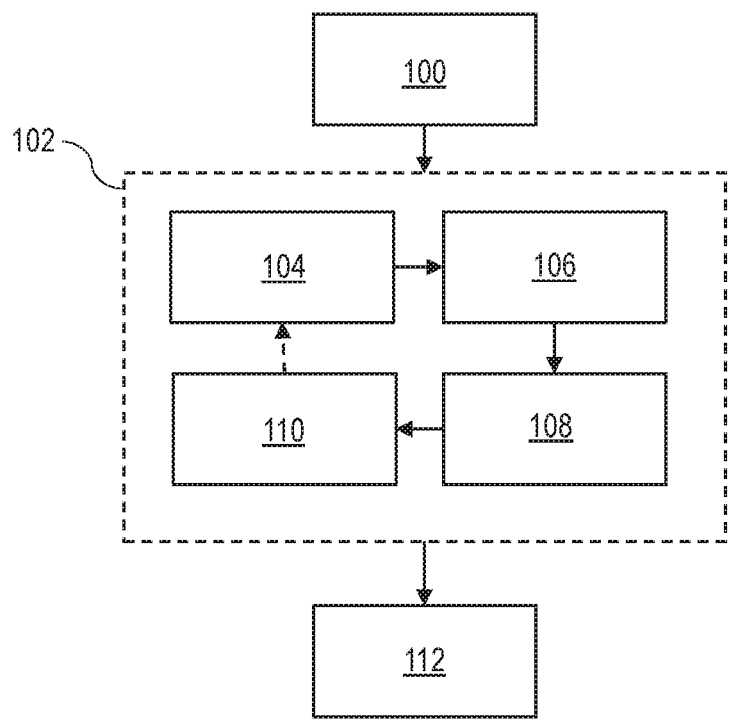
FIG. 5 is a flowchart representation of a method of assembling an acoustic damper according to an embodiment of the present disclosure.

Referring now to FIG. 5, a method of configuring a damper assembly is illustrated in flowchart form.

A panel member having an edge is provided, as illustrated at block 100. According to various embodiments, the edge may define an outer periphery of the panel member, or a periphery of an aperture therethrough.

Damping member characteristics are then determined, as illustrated at block 102. A material composition of the damping member is chosen at sub-step 104. The material composition of the damping member differs from that of the panel member. A peripheral thickness of the damping member is determined in order to match acoustic impedance of the panel member, as shown at sub-step 106. The peripheral thickness may be calculated as described above. A length dimension of the damping member is determined in order to control an effective frequency range, as shown at sub-step 108. The length dimension may be determined by FEM analysis or other suitable method as described above. A thickness profile is determined in order to trap acoustic energy within the damping member, as shown at sub-step 110. The thickness profile may be calculated according to a power law as described above. The sub-steps of block 102 may be iterated until a desirable combination of characteristics is achieved. While depicted in one exemplary sequence, the sub-steps of block 102 may be performed in other sequences as appropriate.

The damping member is then manufactured and assembled to the panel member with a periphery of the damping member coupled to the edge of the panel member, as illustrated at block 112. The assembly step may comprise securing the damping member to the panel member via adhesive, press-fitting, or any other suitable method.

While exemplary embodiments are described above, variations thereof are also contemplated within the scope of the present disclosure. As an example, while the embodiments above describe only a single sink member coupled to a panel, in other embodiments a panel may be provided with a plurality of acoustic sink members in a corresponding plurality of locations.

As may be seen, the present disclosure provides a damping assembly providing desirable acoustic damping properties while having a lower damper mass and volume than known solutions, thereby providing benefits to packaging and range and/or efficiency.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assembly comprising:
   a panel member having a panel edge, the panel member having a first material composition, the panel member having first and second long axes defining a plane and a thickness orthogonal to the plane; and
   an acoustic sink member having a body with a periphery, the periphery being coupled to the panel edge, the body having a second material composition, the second material composition being distinct from the first material composition, wherein an acoustic impedance of the sink member at the periphery is equal to an acoustic impedance of the panel member at the panel edge, and wherein the body has a thickness profile defined by a power law.

2. The assembly of claim 1, wherein the first material composition comprises a metal.

3. The assembly of claim 2, wherein the metal comprises steel.

4. The assembly of claim 1, wherein the second material composition comprises a plastic.

5. The assembly of claim 4, wherein the plastic comprises ABS.

6. The assembly of claim 1, wherein the panel member is a component of a motor vehicle.

7. The assembly of claim 1, wherein the panel member has an aperture extending therethrough, wherein the panel edge defines the aperture, and wherein the sink member is disposed in the aperture.

8. The assembly of claim 1, wherein a thickness of the body of the sink member at the periphery is defined by the relationship $$\left(\frac{T_1}{T_2}\right)^5 = \frac{5}{2}\sqrt{\frac{\rho_2}{\rho_1} \cdot \left(\frac{E_2}{E_1}\right)^3},$$

where T1 is the thickness of the body of the sink member at the periphery, T2 is a thickness of the panel edge, E1 is the Young's modulus of the body, $\rho_1$ is the material density of the body, E2 is the Young's modulus of the panel member, and $\rho_2$ is the material density of the panel.

9. The assembly of claim 1, wherein the power law is define as $$h(x) = (T_1 - t)\left(\frac{x}{L}\right)^m + t,$$
$$2 < m < 4,$$

where h(x) is a local thickness of the body at a position x, $T_1$ is a thickness of the body of the sink member at the periphery, t is a minimum thickness of the body of the sink member, L is a length dimension of the body of the sink member, and m is a power law index.

10. A method of configuring a damper, the method comprising:
    providing a panel member having a panel edge, the panel member having a first material composition;
    determining a second material composition for an acoustic sink member;
    determining a peripheral thickness of the acoustic sink member to match acoustic impedance of the panel member;
    determining a length dimension of the acoustic sink member based on a desired frequency for damping;
    determining a thickness profile of the acoustic sink member based on a power law; and
    assembling the acoustic sink member to the panel edge.

11. The method of claim 10, wherein the first material composition comprises a metal.

12. The method of claim 11, wherein the metal comprises steel.

13. The method of claim 10, wherein the second material composition comprises a plastic.

14. The method of claim 13, wherein the plastic comprises ABS.

15. The method of claim 10, wherein the panel member is a component of a motor vehicle.

16. The method of claim 10, further comprising providing the panel member with an aperture extending therethrough, wherein the panel edge defines the aperture, and wherein assembling the acoustic sink member to the panel edge comprises disposing the sink member in the aperture.

17. The method of claim 10, wherein the peripheral thickness is defined by the relationship $$\left(\frac{T_1}{T_2}\right)^5 = \frac{5}{2}\sqrt{\frac{\rho_2}{\rho_1} \cdot \left(\frac{E_2}{E_1}\right)^3},$$

where T1 is the peripheral thickness, T2 is a thickness of the panel edge, E1 is the Young's modulus of the acoustic sink member, $\rho_1$ is the material density of the acoustic sink member, E2 is the Young's modulus of the panel member, and $\rho_2$ is the material density of the panel.

18. The method of claim 10, wherein the power law is defined as $$h(x) = (T_1 - t)\left(\frac{x}{L}\right)^m + t,$$
$$2 < m < 4,$$

where h(x) is a local thickness of the acoustic sink member at a position x, $T_1$ is the peripheral thickness, t is a minimum thickness of the body of the acoustic sink member, L is a length dimension of the acoustic sink member, and m is a power law index.

* * * * *